Figure 5:
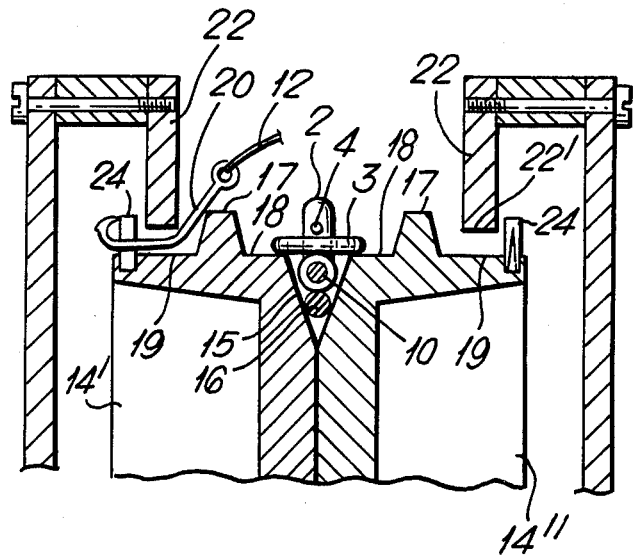

United States Patent [19]

Huse

[11] 4,277,905
[45] Jul. 14, 1981

[54] APPARATUS FOR DETACHING RELEASABLE SNOODS FROM A FISHING LINE

[75] Inventor: Per Huse, Haslum, Norway

[73] Assignee: O. Mustad & Son A/S, Oslo, Norway

[21] Appl. No.: 91,865

[22] Filed: Nov. 6, 1979

[30] Foreign Application Priority Data

Nov. 17, 1978 [NO] Norway .................. 783871

[51] Int. Cl.³ ............................................. A01K 91/00
[52] U.S. Cl. ...................................... 43/4; 43/44.83;
29/283.5; 29/426.6
[58] Field of Search ................ 43/4, 4.5, 5, 6.5, 27.4,
43/44.83, 44.84, 44.85, 44.86, 54.5 A; 29/426.6,
239, 283.5

[56] References Cited

U.S. PATENT DOCUMENTS

| | | | |
|---|---|---|---|
| 3,672,091 | 6/1972 | Cloutier | 43/27.4 |
| 3,903,632 | 9/1975 | Tison et al. | 43/27.4 X |
| 4,149,336 | 4/1979 | Huse | 43/44.84 X |

FOREIGN PATENT DOCUMENTS 104806  8/1964  Norway .................. 43/27.4

Primary Examiner—Gary L. Smith
Assistant Examiner—Robert P. Olszewski
Attorney, Agent, or Firm—Ladas & Parry

[57] ABSTRACT

An apparatus for detaching releasable snoods from a fishing line while at the same time unwinding the snoods from the line, if required, and for depositing the snoods in a storage box continuously as the line is hauled in by means of a winch positioned in front of the apparatus. Said apparatus cooperating with a hook handling means which orients and guides the hooks being drawn along by the snoods, via hook guides, to one or the other side of the circumference of a wheel provided with a peripheral groove for receiving the line, which is drawn over the wheel by a suitable pulling device and sets the wheel in rotation. Each snood having fastening means comprising a peg, rotatably attached to the line, and a ring attached to one end of the snood and detachably retained on the peg. A peg release disk lying resiliently against the periphery of the wheel for partly releasing the said pegs from the said rings. Fixed hook guides which guide the hooks while they are still being pulled along by the snoods, carrying the hooks over the wheel to a point on the wheel circumference at which the hook guides change direction and prevent further forward movement of the hooks, whereby the rings on the snoods are pulled off the pegs.

10 Claims, 6 Drawing Figures

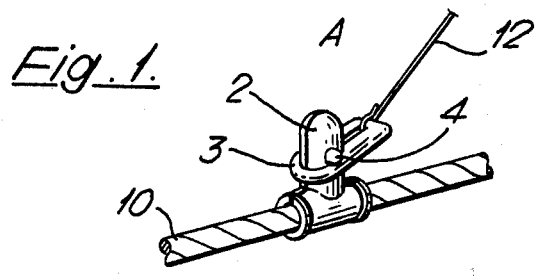
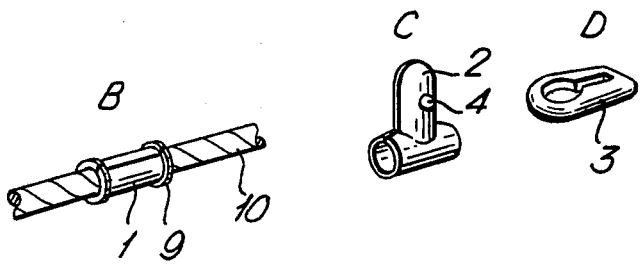
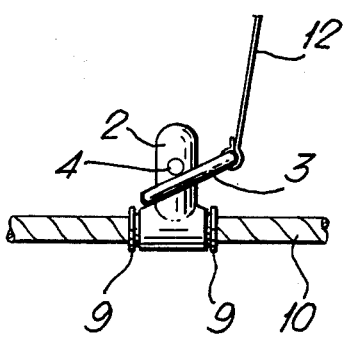
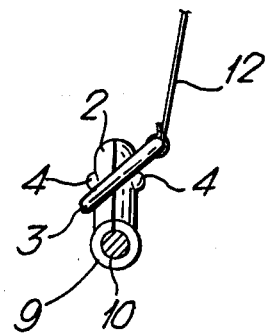

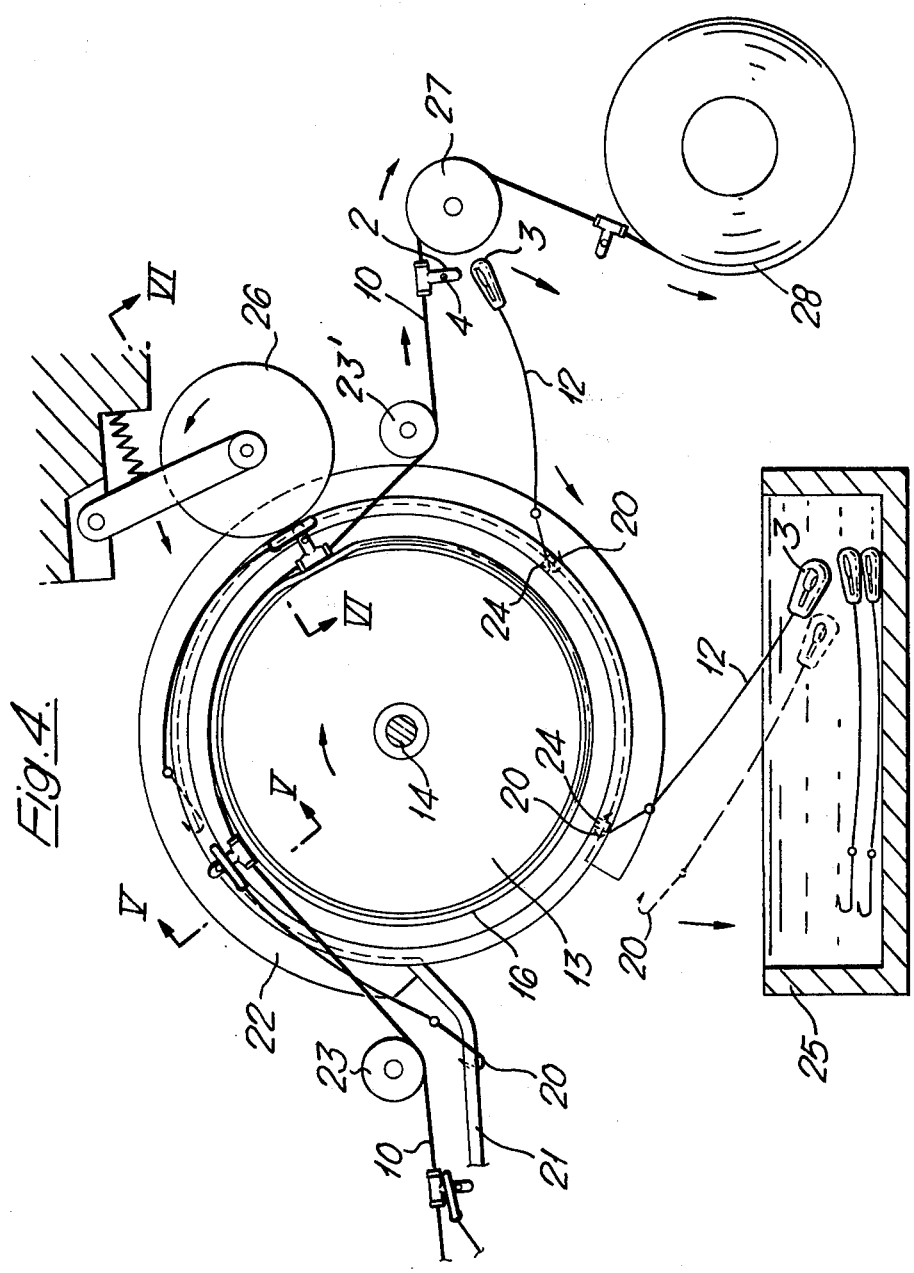

APPARATUS FOR DETACHING RELEASABLE SNOODS FROM A FISHING LINE

The present invention pertains to an apparatus for detaching releasable snoods from a fishing line while at the same time unwinding them from the line, if required, and for depositing the snoods in storage boxes continuously as the like is hauled in by, for example, a winch positioned in front of the apparatus, said apparatus being of the type specified in the preamble of the appurtenant main claim.

The object of the present invention is to perform the operations recited above, and this is achieved in accordance with the invention by the characterizing features disclosed in the appurtenant main claim and subsidiary claims.

An embodiment example of the invention will be described in the following with reference to the accompanying drawings, where FIGS. 1–3 show a release means for fastening snoods to a line, corresponding to the inventor's U.S. Pat. No. 4,149,336.

Figure 6:
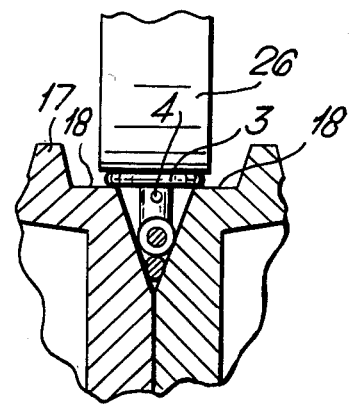

FIG. 4 is a purely schematic illustration of the apparatus of the invention, seen from the side, with the forward half of the wheel over which the line passes and the associated hook guide having been removed to show the parts of the apparatus more clearly, and FIGS. 5 and 6 are cross sections, on a larger scale, through the peripheral portion of the wheel and associated hook guides, drawn along lines V—V and VI—VI in FIG. 4, respectively.

The release means for fastening snoods to a fishing line is clearly shown in FIG. 1A and comprises, as shown in FIG. 1B, a split sleeve with radial end flanges 9 clamped onto the line 10, and a second split sleeve as shown in FIG. 1C with projections extending out from the edges on both sides of the split; the second sleeve is adapted to be placed on the sleeve 1 and clamped together around it, and the projections then constitute a peg 2 having small opposing stops projecting outwardly from the middle section of the peg. The sleeve with the peg 2 is thus pivotally mounted on the sleeve 1, and is held in place by the sleeve flanges 9, 9. A radially flexible ring 3, as shown in FIG. 1D and to which a snood 12 is fastened can be forced down over the peg 2 past the stops 4, and the ring 3 will thus be retained on the peg 2 and can rotate about the peg. When the snood 12 is to be detached from the line 10, the peg 2 is pushed back through the ring 3 with the aid of appropriate means.

FIGS. 2 and 3 show the position of the ring 3 on the peg 2 with tension on the snood 12 and with the longitudinal direction of the ring parallel with the line 10 and transverse of the line 10, respectively.

FIG. 4 shows the apparatus of the invention, comprising a wheel 13 freely rotatable about an axis 14, said wheel preferably being constructed of two identical sections 14' and 14", as seen in FIG. 5. The adjacent inner edges on each half of the wheel are bevelled to form a central, wedge-shaped groove 15 in the wheel periphery, and an annular, elastic body 16 is placed in the bottom of the groove. Each half of the wheel 14', 14" has a cylindrical peripheral surface with an upwardly-projecting, annular ridge 17 spaced inwardly of the outer edge of the peripheral surface, such that the peripheral surface on each half of the wheel, progressing outwardly from the groove 15, consists of a cylindrical surface 18, said ridge 17, and another cylindrical surface 19.

In FIG. 4, the forward half of the wheel with its associated hook guide has been removed to show the parts of the apparatus more clearly.

The apparatus, as shown in FIG. 4, comprises or is connected to a hook handling means (not shown), which orients and guides the hooks 20 onto either one or the other of two hook guides 21, which in turn lead the hooks to hook guides 22 disposed on each side of the circumference of the wheel 13. The apparatus also comprises a breaker roller 23 at the entrance to the wheel and a breaker roller 23' on the discharge side of the wheel, to guide the line 10 onto the wheel 13 and to ensure a degree of engagement between the line 10 and the groove 15 in the wheel 13 over a certain portion of the wheel circumference. When the line 10, having previously been hauled in by a winch and the hooks 20 freed of fish and any residual bait, is pulled by means of a suitable pulling device onto the wheel 13, the latter is set into rotation, and the snoods 12 draw the hooks 20 along the forward hook guides 21 and into the hook guides 22 disposed on both sides of the circumference of the wheel, the hooks being pulled by the snoods to a point on the wheel circumference which lies almost diametrically opposite the entrance end of the hook guides 22. The hook guide 22 extends past said first point and continues around beneath the wheel 13, such that the hooks are then made to travel back in a direction opposite of the direction of advance for the line 10. Said backward travel of the hooks 20 in the hook guide 22 and their exit therefrom is accomplished by means of catch pins 24 arranged, as clearly seen in FIG. 5, on the periphery of the wheel 13, in cooperation with the fixed guides 22, whose arc-shaped guide edges 22' together with the cylindrical surface 19 and ridge 17 on the wheel form a slot-shaped guide for the hook 20. When the hook 20 is no longer pulled through the hook guide 22 by the snood 12, the catch pin 24, which is located closely adjacent to but exterior of the guide edge 22', assumes the task of leading the hook 20 to the exit end of the hook guide, where the hook falls down into a storage box 25 together with the snood 12 and the fastening ring 3, which has in the meantime been released from the peg 2 on the line 10.

The release of the ring 3 from the peg 2 is accomplished by means of a peg release disk 26, which is held by spring force against the periphery of the wheel 13 between the ridges 17, 17 and presses the stops partially down through the ring 3 as the peg is pressed down into the wedge-shaped groove 15, which also causes the elastic body 16 in the groove to become compressed, while the ring 3 is supported on the cylindrical surfaces 18 on each side of the groove 15. Thus, the stops 4 are forced down past the ring 3, and the ring 3 is retained with a certain degree of friction on the outer end of the peg 2. The elastic body 16 prevents the peg from passing completely through the ring 3. Said elastic body 16 also prevents the line 10 from pulling the pegs 2 out of the rings 3 before they reach the peg release disk 26. When the line 10 with the peg 2 and snood ring 3 leave the wheel 13 via the breaker roller 23', the snood 12 will be stretched out, because the peg 2 and the ring 3 together with the line 10 are moved away from the circumference of the wheel 13 while the hook 20 remains caught in the hook guide 22. In this manner, the snood 12, owing to the tension under which it is held, becomes unwound from the line 10 if the two have become twisted together, the peg 2 with the ring 3 rotating about the line 10 during said unwinding, after which the ring 3 is pulled free of the outer end of the peg, exterior of the stops 4.

This tensioning of the snoods 12 with the resultant unwinding and release of the ring 3 from the peg 2 is also brought about in part due to the action of the catch pin 24 on the wheel 13, which has previously come into engagement with the hook 20 and carries it further along the hook guide 22 in a direction opposite of the direction of advance for the line 10. When the hook 20 has been guided to the end of the hook guide 22, it slides off, as mentioned above, into a storage box 25, the unit consisting of the hook 20, the snood 12 and the ring 3 then being stretched out almost straight. The complete snood units, having thus been released and collected, can then be stored in the box 25, and can later be coupled to the line 10 for resetting after having passed through a baiting machine.

The line 10, now freed of the snoods 12, is then optionally guided over another breaker roller 27 to a winder spool 28, and the entire length of line can then be wound up without any intervening operations being necessary, as the snoods have already been attended to, which is not the case for lines having fixed snoods.

FIG. 5, the peg 2 on the line 10 and the ring 3 connected to the snood 12 are shown while still joined together, the ring 3 being retained on the peg by the stops 4. The line 10 and the sleeve-shaped base of the peg 2 rest against the elastic body in the wedge-shaped groove 15 of the wheel 13. In FIG. 6, the peg 2, by means of the peg release disk 26, has been partially pressed down through the ring 3, which rests on the cylindrical surfaces 18 adjacent to the groove 15. The elastic body 16 has been partially compressed and ensures that the peg 2 cannot be pushed completely through the ring 3. The ring 3, which in this position lies exterior of the stops, is held in place by friction on the outer end of the peg and will be pulled free of the peg during the further advance of the line 10, as discussed above.

The embodiment example described herein should not be construed as limiting the scope of the invention. For example, the hook guides 22 could easily be arranged independent of the wheel 13, such that the guides would merely lead the hooks 20, which are drawn along by the snoods 12, past the wheel 13. The hook guides 22 could in this case be curved downwardly at the ends so that they would retain the hooks 20, the line 10 with the pegs 2 and rings 3 running out from the wheel 13. One would then obtain the desired unwinding of the snood 12 and the release of the rings 3 from the pegs 2, after which the hooks 20 with snoods would fall down into the storage case 25. To ensure that the hooks 20 do become detached and fall down from the hook guide 22, one could either arrange catch pins on the wheel 13 to cooperate with the hooks 20 at the rearward section of the hook guide 22, or provide catch pins which are indirectly driven by the line 10 or wheel 13 or which are driven by separate drive means.

The groove 15 in the wheel 13 does not necessarily have to exhibit the illustrated wedge-shaped cross-sectional configuration, but might instead, for example, have a U-shaped cross section.

In addition, an embodiment of the wheel 13 can also be imagined in which the elastic body 16 has been omitted. One would in that case ensure, for example, that the tension in the line 10 would not become so great that the pegs 2 would be pulled out of the rings 3 before the pegs reach the peg release disk 26, or one would dimension the depth of the groove such that the sleeve-formed base of the peg, even if the peg's stops 4 were pulled out of the rings, would still rest against the bottom of the groove 15, while the upper portion of the peg 2 above the stops 4 would project above the cylindrical surface 18 and remain engaged with the ring 3. In this case, the peg release disk 26 would merely function to push those pegs 2 which did not become partially withdrawn from the rings 3 owing to the tension in the line, partially through the rings so that the rings would pass from the secured position to the released position.

Having described my invention, I claim:

1. An apparatus for detaching releasable snoods from a fishing line while at the same time unwinding the snoods from the line, if required, and for depositing the snoods in a storage box continuously as the line is hauled in by means of, for example, a winch positioned in front of the apparatus, said apparatus having or being associated with a hook handling means which orients and guides the hooks being drawn along by the snoods, via hook guides, to one or the other side of the circumference of a wheel provided with a peripheral groove for receiving the line, which is drawn over the wheel by a suitable pulling device and sets the wheel in rotation, said line being provided with releasable snoods whose fastening means comprises a peg, rotatably attached to the line and having small stops in the middle section of the peg, and a radially resilient ring attached to one end of the snood and detachably retained on the peg inward of said stops, the apparatus also including a peg release disk disposed on the side of the wheel from which the line is discharged, said disk lying resiliently against the periphery of the wheel for releasing the said pegs from the said resilient rings, the pegs being pushed partially down through the rings by said peg release disk and down into the said groove in the wheel while the rings remain in contact with the sides of the groove, whereby the stops are guided from a securing position on one side of the ring into a release position on the other side of the ring, characterized by fixed hook guides disposed at each side of the wheel for receiving the said hooks from the said guides which guide the hooks while they are still being pulled along by the snoods carrying the hooks over the wheel to a point on the wheel circumference at which the hooks guides change direction and prevent further forward movement of the hooks, whereby the rings on the snoods are pulled off the pegs during a possible simultaneous unwinding of the snoods from the line owing to the tension produced in the snoods, and the hooks slide down off the ends of the hook guides and are deposited in a storage box.

2. An apparatus according to claim 1, characterized by at least one outwardly-projecting catch pin on each side of the wheel circumference for engagement with one hook at a time in at least the rearward section of the hook guide, for pushing the hook off the end of the hook guide.

3. An apparatus according to claim 2, characterized in that the fixed hook guides are arc-shaped, and that they are disposed on each side of the circumference of the wheel and extend to a point beneath the wheel.

4. An apparatus according to claim 3, characterized in that each hook guide constitutes an arc-shaped guide edge on a disk, said guide edges being spaced a short distance from and cooperating with a cylindrical surface at the edge of the wheel in order to form a slot into which the curved bowl of the hook can slide, the tip of the hook lying exterior of and the shaft of the hook lying interior of the guide edge in relation to the plane of symmetry of the wheel, said cylindrical surface being restricted in the inward direction by a circular ridge spaced a distance interior of the inner face of the guide edge for the formation of a slot for the hook shaft and to prevent the hook from being pushed out of the slot between the cylindrical surface and the guide edge.

5. An apparatus according to claim 4, characterized in that the catch pin is disposed at the outer edge of the cylindrical surface and projects radially outwards therefrom, and lies exterior of but closely adjacent to the guide edge.

6. An apparatus according to claim 1, characterized in that the peripheral surface of the wheel comprises two symmetrically-disposed circular ridges spaced a distance from the edges of the peripheral surface, and that the groove of the wheel is disposed between said ridges and equidistant therefrom.

7. An apparatus according to claim 6, characterized in that the groove is wedge-shaped.

8. An apparatus according to claim 6, characterized in that an elastic body is provided in the bottom of the groove for supporting the line and pegs, in order thereby to prevent the line from pulling the pegs out of the rings before they reach the peg release disk when the line is being pulled through the apparatus.

9. An apparatus according to claim 7, characterized in that the elastic body, for example, in the form of a rubber ring, is supported against the side walls of the wedge-shaped groove.

10. An apparatus according to claim 6, characterized in that the groove is dimensioned such that when the pegs with their sleeve-formed base lie against the bottom of the groove, the part of the pegs which is located above the stops projects up above the upper margin of the groove.

* * * * *